(12) United States Patent
Cleeves et al.

(10) Patent No.: US 9,528,402 B2
(45) Date of Patent: Dec. 27, 2016

(54) EARLY EXHAUST VALVE OPENING FOR IMPROVED CATALYST LIGHT OFF

(71) Applicant: Pinnacle Engines, Inc., San Carlos, CA (US)

(72) Inventors: James M. Cleeves, Redwood City, CA (US); Michael A. Willcox, Redwood City, CA (US)

(73) Assignee: Pinnacle Engines, Inc., San Carlos, CA (US)

( * ) Notice: Subject to any disclaimer, the term of this patent is extended or adjusted under 35 U.S.C. 154(b) by 323 days.

(21) Appl. No.: 14/444,955

(22) Filed: Jul. 28, 2014

(65) Prior Publication Data

US 2015/0040876 A1    Feb. 12, 2015

Related U.S. Application Data

(60) Provisional application No. 61/859,036, filed on Jul. 26, 2013.

(51) Int. Cl.

| | |
|---|---|
| *F01L 13/00* | (2006.01) |
| *F01N 3/20* | (2006.01) |
| *F01N 9/00* | (2006.01) |
| *F02D 41/02* | (2006.01) |
| *F02D 13/02* | (2006.01) |
| *F02D 15/00* | (2006.01) |
| *F02B 25/08* | (2006.01) |

(52) U.S. Cl.
CPC ......... *F01L 13/0015* (2013.01); *F01N 3/2006* (2013.01); *F01N 9/00* (2013.01); *F02D 13/0215* (2013.01); *F02D 15/00* (2013.01); *F02D 41/0245* (2013.01); *F01N 2430/10* (2013.01); *F02B 25/08* (2013.01); *F02D 13/0261* (2013.01); *Y02T 10/18* (2013.01); *Y02T 10/26* (2013.01)

(58) Field of Classification Search
CPC ............ F01L 13/00; F01L 1/34; F02D 13/02; F02D 13/0215; F02D 15/00; F02D 41/0245; F02D 13/0261; F01N 3/20; F01N 3/2006; F01N 2430/10; Y01T 10/20; Y01T 10/18
See application file for complete search history.

(56) References Cited

U.S. PATENT DOCUMENTS

| | | | | |
|---|---|---|---|---|
| 6,055,948 | A | * | 5/2000 | Shiraishi ................... F01L 1/34 123/243 |
| 6,212,879 | B1 | * | 4/2001 | Nishimura .......... F02D 41/0255 123/406.54 |
| 7,559,298 | B2 | | 7/2009 | Cleeves |
| 7,597,092 | B2 | | 10/2009 | Eser et al. |
| 7,886,523 | B1 | | 2/2011 | Legare |

(Continued)

FOREIGN PATENT DOCUMENTS

| | | |
|---|---|---|
| DE | 10002483 A1 | 7/2001 |
| DE | 10259052 B3 | 4/2004 |

(Continued)

*Primary Examiner* — Hieu T Vo
(74) *Attorney, Agent, or Firm* — Mintz Levin Cohn Ferris Glovsky and Popeo, P.C.

(57) ABSTRACT

Energy to speed heating of a catalyst associated with an internal combustion engine can be provided in the form of sensible energy (heat) via hot combustion products. In some variations, timing of opening and/or closing of an exhaust valve can be manipulated to increase sensible heat delivered to the catalyst in the exhaust gases.

21 Claims, 3 Drawing Sheets

(56) References Cited

U.S. PATENT DOCUMENTS

| | | |
|---|---|---|
| 8,413,619 B2 | 4/2013 | Cleeves |
| 8,776,739 B2 | 7/2014 | Cleeves et al. |
| 8,910,606 B2 | 12/2014 | Cleeves et al. |
| 9,243,578 B2 | 1/2016 | Cleeves et al. |
| 2003/0070423 A1 | 4/2003 | Morinaga et al. |
| 2006/0162321 A1 | 7/2006 | Zillmer et al. |
| 2011/0041799 A1 | 2/2011 | Cleeves et al. |
| 2012/0085309 A1 | 4/2012 | Cleeves et al. |
| 2012/0089316 A1 | 4/2012 | Cleeves et al. |
| 2012/0158273 A1 | 6/2012 | Cleeves et al. |
| 2012/0330534 A1 | 12/2012 | Cleeves et al. |
| 2013/0220279 A1 | 8/2013 | Cleeves |
| 2014/0000567 A1 | 1/2014 | Cleeves |
| 2014/0007840 A1 | 1/2014 | Cleeves et al. |
| 2014/0083222 A1 | 3/2014 | Cleeves |
| 2014/0102418 A1 | 4/2014 | Babu et al. |
| 2014/0182549 A1 | 7/2014 | Cleeves |
| 2014/0311431 A1 | 10/2014 | Cleeves |
| 2014/0331646 A1 | 11/2014 | Cleeves |
| 2014/0373802 A1 | 12/2014 | Cleeves |
| 2015/0053031 A1 | 2/2015 | Willcox et al. |
| 2015/0059694 A1 | 3/2015 | Cleeves et al. |

FOREIGN PATENT DOCUMENTS

| | | | |
|---|---|---|---|
| DE | 102004016386 A1 | 10/2005 | |
| DE | 102004030605 B3 | 2/2006 | |
| FR | 2854659 A1 | 11/2004 | |
| GB | 2267310 A | 12/1993 | |
| JP | 2001132438 A * | 5/2001 | ............... F01N 3/24 |
| WO | WO-99/42718 A1 | 8/1999 | |
| WO | WO-2007016713 A2 | 2/2007 | |

\* cited by examiner

EARLY EXHAUST VALVE OPENING FOR IMPROVED CATALYST LIGHT OFF

CROSS-REFERENCE TO RELATED APPLICATION

The current application claims priority under 35 U.S.C. §119(e) to U.S. provisional patent application Ser. No. 61/859,036 filed on Jul. 26, 2013, and under 35 U.S.C. §120 to international application number PCT/US2014/048335 filed on Jul. 26, 2014, which are both incorporated by reference herein in their entireties.

TECHNICAL FIELD

The subject matter described herein relates to internal combustion engines, such as for example internal combustion engines in which a catalyst is used to chemically convert combustion by-products in exhaust gases.

BACKGROUND

Catalytic converters are incredibly efficient at converting pollutants into benign gases once the catalyst material has reached a sufficiently high temperature. For example, hydrocarbon and carbon monoxide gases in the exhaust are oxidized using a small amount of excess oxygen in the presence of the catalyst to produce water and carbon dioxide. In a three-way catalyst, oxides of nitrogen (e.g. NO and $NO_2$, which are collectively referred to as $NO_x$) are also removed through a reduction reaction to produce nitrogen gas ($N_2$) and water. However, a catalytic converter generally requires heating to a temperature in excess of 200° C. or even 250° C. before becoming effective. At temperatures above 350° C. little if any pass-through of the targeted pollutants typically occurs. The temperature at which a catalyst becomes effective for removal of pollutants can be referred to as its light-off temperature or its minimum target operating temperature. During the heat-up phase, exhaust pollutants pass out of the system untreated while sensible (thermal) energy in the exhaust gas is used to heat up the catalyst until it gets warm enough to catalyze the necessary pollutant-removal reactions. In many cases, these untreated pollutants can constitute a significant (in some cases a majority) fraction of the total pollutants emitted during a drive cycle.

Previously described approaches to the issue of cold catalyst pollutant emissions have focused on pre-heating the catalyst, for example by electrolyzing water to create hydrogen and oxygen, which can be delivered to the catalyst at engine start-up so that spontaneous catalytic recombination of the hydrogen and oxygen can rapidly raise the temperature of the catalyst substrate to a temperature at which the desired pollutant-removal reactions occur efficiently. Such an approach can be undesirable in that an extra energy input is required, which can lead to higher running costs. The added system complexity involved in including a water source and electrolysis apparatus is also generally undesirable.

Another concern with existing catalytic converters is the injection of extra fresh air, known as secondary air injection, in the exhaust manifold, to bring the catalytic converter up to light-off temperature more quickly. When the engine is cold, the secondary air can provide an optimum mixture composition to increase the reactivity of the catalyst on the extra-rich exhaust which is being produced during engine warm-up, thereby generating heat which assists in heating up the catalytic converter. After the light-off temperature of the catalytic converter is reached, the secondary air provides sufficient oxygen to enable the conversion of carbon monoxide and unburned hydrocarbons. However, such a system requires a pump to inject the air in effectively, which can create an extra load on the engine and hence increases energy usage.

A related, co-pending and co-owned application (U.S. patent application Ser. No. 14/274,612) discusses, among other features, adjustment of a fuel-air ratio in the fuel mixture in the combustion chamber of an engine to enhance the amount of hydrogen gas ($H_2$) in the effluent passing to the catalyst under low temperature operations. The resulting hydrogen gas reacts with the catalyst and available oxygen ($O_2$) at a relatively low temperature, and the resulting oxidation reaction releases energy and heat to speed the warm-up of the catalyst, thereby causing the catalyst to reach its effective temperature more quickly and improving the removal of pollutant compounds from the exhaust stream immediately after engine start-up.

It would be desirable to provide an improved way of reducing the time taken for a catalyst or catalytic converter to heat up to an effective operating temperature, for example at engine start-up, which could be used instead of or additionally to chemical energy methods.

SUMMARY

Implementations of the current subject matter can include features relating to more rapidly heating a catalyst or catalytic converter from a low temperature at which it is not effective at removing exhaust pollutants to an operating temperature at which such pollutants are efficiently removed from engine exhaust. In some examples, energy to heat the catalyst can be provided in the form of sensible energy (heat) via hot combustion products instead of (or in addition to) chemical energy in the form of, for example, carbon monoxide, hydrocarbons, $NO_x$, hydrogen gas, or other partially reacted combustion products. Approaches such as those described herein can be used for heating a catalyst at cold or cool engine start up. In addition, variations can be applied during on-going engine operation if the catalyst became too cold due to low exhaust gas temperature or extended light usage.

In one aspect, a system includes an exhaust valve controlling flow of gases for a cylinder of an internal combustion engine, and a controller system configured to perform operations of the internal combustion engine. The controller system is configured to perform operations that include opening the exhaust valve according to a first valve timing that is advanced relative to a second valve timing and changing to the second timing, which includes later opening of the exhaust valve, when a catalyst reaches the minimum target operating temperature. The opening results in a reduced amount of work being extracted from combustion of a fuel-air mixture in the cylinder due to exhaust gases produced by the combustion of the fuel-air charge retaining energy not converted to work in the form of excess sensible heat. The opening further results in the exhaust gases with the excess sensible heat being delivered to the catalyst to cause accelerated heating of the catalyst.

In another aspect, a method includes opening an exhaust valve of an internal combustion engine with a first valve timing that is advanced relative to a second valve timing for opening of the exhaust valve, extracting a reduced amount of work from combustion of a fuel-air mixture in a cylinder having an exhaust port controlled by the exhaust valve as a result of the advanced first valve timing of the exhaust valve opening and causing exhaust gases produced by the combustion of the fuel-air charge to retain energy not converted to work in the form of excess sensible heat. The exhaust gases with the excess sensible heat are delivered to the catalyst to cause accelerated heating of the catalyst. When the catalyst reaches a minimum target operating temperature, a change is made to the second valve timing.

In optional variations, one or more of the following features can be included in any feasible combination. For example, the internal combustion engine can include an opposed-piston engine, and the opposed-piston engine can optionally include two crankshafts attached to two respective opposed pistons. The opposed piston engine can further include a phasing mechanism for varying a piston timing with which the two respective opposed pistons reach respective top dead center position. The changing to the second valve timing from the first valve timing can include changing the driving of the exhaust valve from a leading crankshaft of the two crankshafts to a trailing crankshaft of the two crankshafts. The changing to the second valve timing from the first timing can optionally include operation of a phasing mechanism that alters a cam timing of at least one valve cam of the internal combustion engine relative to at least one crankshaft of the internal combustion engine.

In other optional variations, the first valve timing can include initiating opening of the exhaust valve when a piston reciprocating in the cylinder is between approximately 20° after top dead center and approximately 60° before bottom dead center on a power stroke of a four-stroke engine cycle of the internal combustion engine. The first valve timing can further include closing the exhaust valve after an end of an exhaust stroke that follows the power stroke. The first valve timing can include closing the exhaust valve prior to an end of the exhaust stroke such that some of the exhaust gases are retained within the cylinder at a start of an intake stroke that follows the exhaust stroke. The first valve timing can include a delayed opening of an intake valve such that piston work compresses and increases the sensible heat of the retained exhaust gases. At least some of the retained exhaust gases can be drawn into an intake manifold of the internal combustion engine upon opening of an intake valve. The intake valve can open earlier during the first valve timing than during the second valve timing. The earlier opening of the intake valve can reduce pumping work required of the internal combustion engine. In some examples, the retained exhaust gases can be drawn into the intake manifold with air and/or fuel to create a next fuel-air mixture for a next cycle of the internal combustion engine. The mixing can cause a temperature of the next fuel-air mixture to be increased prior to delivery of the next fuel-air charge to the cylinder. The next fuel-air mixture can be delivered to the cylinder during a remainder of the intake stroke for combustion during a next power stroke. The internal combustion engine can be operated at a first compression ratio at least approximately concurrently with the first timing that is higher that a second compression ratio used at least approximately concurrently with the second timing. The first compression ratio can assist with stabilizing combustion during dilution of the fuel-air mixture resulting from the mixing of the retained exhaust gases drawn into the intake manifold.

In other optional variations, the internal combustion engine can be operated at a first compression ratio at least approximately concurrently with the first timing. The first compression ratio is higher that a second compression ratio used at least approximately concurrently with the second timing. The first compression ratio can be in a range of approximately 12:1 to 25:1. The first compression ratio can be used instead of enriching the fuel-air mixture with excess fuel for combustion stability during low temperature engine operation. In other variations, the first compression ratio used at least approximately concurrently with the first timing can be lower than the second compression ratio used at least approximately concurrently with the second timing. The lower first compression ratio can further reduce the reduced amount of work extracted from combustion of the fuel-air mixture, thereby resulting in a greater amount of sensible heat being retained for delivery to the catalyst. Examples of this lower first compression ratio can be in a range of approximately 8:1 to 10:1.

In various implementations, a determination can be made that a temperature of the catalyst is below a minimum target operating temperature of the catalyst. Based on the determining, the opening of one or more exhaust ports can be performed according to the first valve timing.

Heat can also be added to the catalyst during the first valve timing by a chemical process, which can include generating hydrogen and oxygen by manipulating combustion conditions in the cylinder and/or the cylinder and at least one other cylinder of the internal combustion engine to result in a reforming reaction, and delivering the generated hydrogen and oxygen for reaction at the catalyst.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein. For example the controller system discussed above can include computer circuitry configured to perform various operations consistent with the described methods. Alternatively or in addition, the controller system can include one or more programmable processors that receive instructions from a machine-readable medium. The instructions can cause the one or more programmable processors to perform the operations described.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Aspects of the current subject matter can provide improved approaches to heating a catalyst of a catalytic converter to an operating temperature as quickly as possible, for example by increasing the temperature of exhaust gases being delivered to the catalyst. Operation of an internal combustion engine with which such a catalytic converter is associated can be adjusted under conditions at which the catalyst is determined to be below a minimum target operating temperature. An aspect of operation which can be adjusted is the point in an engine cycle at which one or more exhaust ports to a combustion chamber of the engine are opened. If an exhaust port is opened earlier in a combustion cycle than is usual under normal engine operating conditions, less work is extracted from the power stroke of that cycle than would be in a normal cycle, which results in the exhaust gases retaining more heat than would otherwise be the case. These exhaust gases can be transferred to the catalyst with the exhaust stroke of the power stroke or retained for use in a subsequent engine cycle, resulting in the exhaust gases of that subsequent cycle being at an elevated temperature as compared to exhaust gases of a regular engine cycle. It will be understood by those skilled in the art that the opening and closing of intake and exhaust valves is directly related to the opening and closing of intake and exhaust ports respectively. In the following, reference to opening and closing of ports and valves is intended to imply a similar effect and the two terms are effectively used interchangeably.

Figure 1:
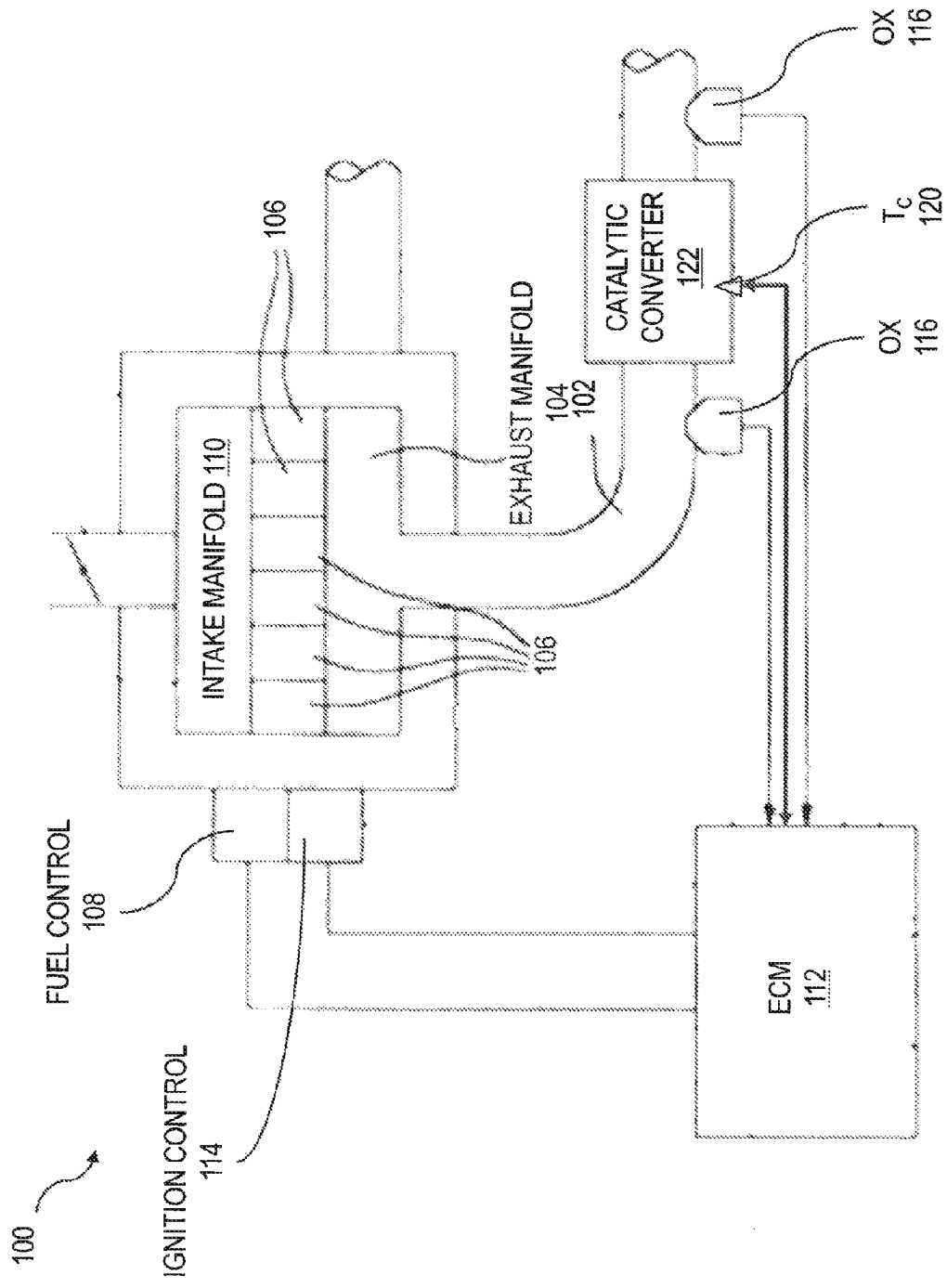
FIG. 1 shows a diagram illustrating aspects of a system showing features consistent with implementations of the current subject matter.

FIG. 1 shows a diagram of an example engine 100 showing features consistent with one or more implementations of the current subject matter. It will be understood by one of ordinary skill in the art that the features shown in FIG. 1 are merely exemplary and not in any way intended to be limiting. Implementations of the current subject matter are compatible with a variety of engine configurations and operating modes, including spark ignited and compression ignited engines, fuel injected and carbureted fuel delivery systems, etc.

In some examples, the engine 100 can be an opposed piston engine, in which two pistons occupy a cylinder with motion of the pistons bringing their respective piston crowns into relative proximity at top dead center and relatively further apart at bottom dead center engine timing. A non-limiting example of such an engine is described in co-owned U.S. Pat. No. 7,559,298. An opposed piston engine need not be operated with both of the opposed pistons having the same timing, for example as described in co-owned U.S. Pat. No. 8,413,619. In other examples, the engine 100 can be a conventional engine in which one piston occupies each cylinder of the internal combustion engine.

The engine 100 can have any number of cylinders, each of which can include a combustion chamber formed at least in part by at least one piston crown and optionally also one or more of a cylinder head, a cylinder wall formed as part of an engine block, a second piston crown (e.g. in an opposed piston engine), a sleeve valve body (e.g. in an engine in which one or more intake or exhaust ports to serve the combustion chamber are controlled by a reciprocating sleeve valve), or other engine structures. Fuel and air (or some other oxidant) are provided into the combustion chamber to form a combustion mixture. Exhaust gases from at least partial combustion of the combustion mixture are vented from the combustion chamber via one or more exhaust ports as discussed below. For the remainder of this disclosure, the term "cylinder" is intended to generally equate to the term "combustion chamber" unless such an interpretation is incongruous with the context in which the term is used.

With further reference to FIG. 1, an exhaust passage 102 can transmit exhaust gases from an exhaust manifold 104 that receives effluent gases from one or more cylinders 106. Flow of exhaust gases into the exhaust manifold from the cylinder(s) 106 is regulated by one or more exhaust valves (not shown). Air and fuel (or just air in a diesel or other direct injection engine) are provided to the cylinder(s) 106 under the control of one or more intake valves (not shown). A fuel control device 108 (e.g. fuel injectors, a carburetor, etc.) can control the flow of fuel to the cylinder(s) 106. For a spark-ignited engine, an air flow rate of intake air delivered via an intake manifold 110 and a flow of fuel controlled by the fuel control device 108 can produce a desired air-fuel ratio for the combustion mixture delivered to each cylinder. The fuel control device 108 can be controlled by commands from an engine control module (ECM) 112, which can also optionally control an ignition control device 114 (e.g. a spark plug or spark plug control). The ECM 112 can also receive data signals from one or more oxygen sensors (OX) 116 placed in the exhaust passage (e.g. upstream and downstream of the catalytic converter 122). For example, a measured percentage of oxygen downstream of the catalyst higher than that upstream of the catalyst would indicate that the catalyst is working effectively to reduce nitrogen oxides, whereas a measured percentage of oxygen downstream of the catalyst lower than that upstream of the catalyst would indicate that the catalyst has not reached sufficient a temperature to be operating effectively (e.g. the catalyst has not reached, or has fallen below, its minimum target operating temperature). The conversion rate and concentrations of unburned or partially burned fuels, for example hydrocarbons (HC) as well as carbon monoxide (CO), will also influence the relative oxygen content prior to and after the catalyst. One skilled in the art will readily understand that oxygen content differences across a catalyst can provide an indication of whether or not the catalyst is operating above its minimum target operating temperature.

The ECM 112 can also or alternatively receive data from a catalyst temperature sensor 120 positioned to measure a current temperature of a catalyst 122 through which the exhaust passage 102 directs the exhaust gases. The catalyst temperature sensor ($T_C$) 120 can be a thermocouple or any other suitable device providing temperature data in a reproducible manner. The measured temperature provides an indication as to whether or not the catalyst has reached its minimum target operating temperature and accordingly whether or not it is has reached an efficient operating temperature.

Consistent with implementations of the current subject matter, exhaust valve timing directly after startup can be advanced so that the exhaust valve opens well before the piston reaches bottom dead center on the expansion (power) stroke. In some examples in which an opposed piston engine includes a variable phasing mechanism for providing variable compression ratio operation (e.g. as in co-owned U.S. Pat. No. 8,413,619), the timing of the exhaust valve can advantageously remain "pinned" or otherwise set in the advanced position in the variable phasing mechanism at the time of engine shutdown so that the exhaust valve timing is in the proper setting for advanced exhaust valve opening on cold start-up. In one example, the advanced exhaust valve opening timing can be at approximately 150° of crank angle before bottom dead center of the expansion stroke.

In a first implementation of the current subject matter, the extra heat provided in exhaust gases exiting the cylinder due to early exhaust valve opening can be realized while leaving the exhaust valve open until at or near a top dead center position of the piston(s) on the exhaust stroke, which follows the expansion stroke in a four-stroke engine cycle. A system for varying the duration of a valve event can enable early exhaust valve opening for faster catalyst light off while leaving the timing of the exhaust valve closing unaffected. Such an approach can result in a long duration of the exhaust valve being open, which enables exhaust gases generated to be used during engine warm up to provide extra heat to a catalyst, A shorter duration of the exhaust valve being open can optionally be used for normal idle. The additional sensible heat/thermal energy in the exhaust gas as a result of the early exhaust valve opening can be transferred to the catalyst by the exhaust stroke of that engine cycle.

The timing of either or both (or neither) of the exhaust valve opening and closing events can optionally be phased relative to other engine cycle events in various implementations of the current subject matter. In other words, the timing of either or both of the exhaust valve opening and closing can be advanced or retarded relative to the timing of one or more engine crankshafts (e.g. either or both crankshafts in an opposed piston engine) and/or the timing of an intake valve opening and/or closing. Phasing of the valve timing can optionally occur through operation of a phasing mechanism, which can include any type of phaser suitable for use with gear drives, chain drives, belt drives, and/or other connections between one or more rotating shafts (e.g. crankshafts, camshafts, etc.). Some non-limiting examples of such phasers are described in co-owned U.S. Pat. No. 8,413,619.

In some implementations of the current subject matter, the duration of the exhaust valve lift profile remains unchanged, or substantially unchanged. In this case, an exhaust valve with an advanced opening timing will also close well before the piston reaches a top dead center position during the exhaust stroke. In this manner, a significant volume of hot exhaust gas can be trapped and compressed in the cylinder 106 at the end of the exhaust stroke. If the intake valve timing is maintained at or at least close to that used in normal engine operation, such that the intake valve opens when the piston position is at or near to top dead center at the start of the intake stroke of a four-stroke cycle, the opening of the intake valve at this point of the engine cycle can release at least some of the compressed exhaust gas within the cylinder 106 back into the intake manifold 110. The exhaust gas released into the intake manifold in this manner can then be drawn back into the combustion chamber as piston motion away from top dead center occurs on the intake stroke. Mixing of the hot exhaust gases remaining from the previous cycle with the cooler incoming charge of fuel and/or air can effectively pre-heat the incoming charge. Reducing the enrichment required for stable combustion during cold operation and warm-up will reduce engine-out emissions from unburned or partially burned fuel that lacks the in-cylinder oxygen to combust, but also increases the sensible energy in the exhaust due to the reduction of the fuel's evaporative cooling effect. In some examples, the intake timing can be adjusted to optimize the reverse flow (e.g. of exhaust gases into the intake manifold 110) to balance the pre-heating of the intake charge with permissible dilution levels for stable engine operation. For example, the intake timing can be adjusted such that one or more intake valves open later than would be the case under normal operating conditions, opening at or close to top dead center.

As a result of pre-heating that can result from reverse flow of trapped exhaust gases into the intake manifold 110, the incoming gaseous mixture (and fuel in the incoming mixture or fuel added by direct injection into the cylinder) is hotter than would be the case under normal operating conditions. The additional heat can optionally lead to faster and/or more complete combustion of the newly added and pre-heated charge, thereby reducing the generation of products of incomplete combustion during a cold-start condition in the engine. Additionally, the additional combustion stability of the pre-heated charge can allow the enrichment during cold startup to be reduced and magnitude of secondary air injection reduced, both of which can increase the sensible (heat) energy in the exhaust gas and speed catalyst lightoff. Following the power stroke resulting from combustion using this elevated temperature charge, the resulting exhaust gases can be hotter than exhaust gases would be following a regular power stroke, due to either or both of a higher starting temperature and more rapid combustion of the fuel. These exhaust gases can be delivered to the catalyst of the catalytic converter 122, thereby assisting heating of the catalyst while also advantageously containing lower concentrations of unburned fuel, carbon monoxide, and other incomplete combustion products.

Figure 2:
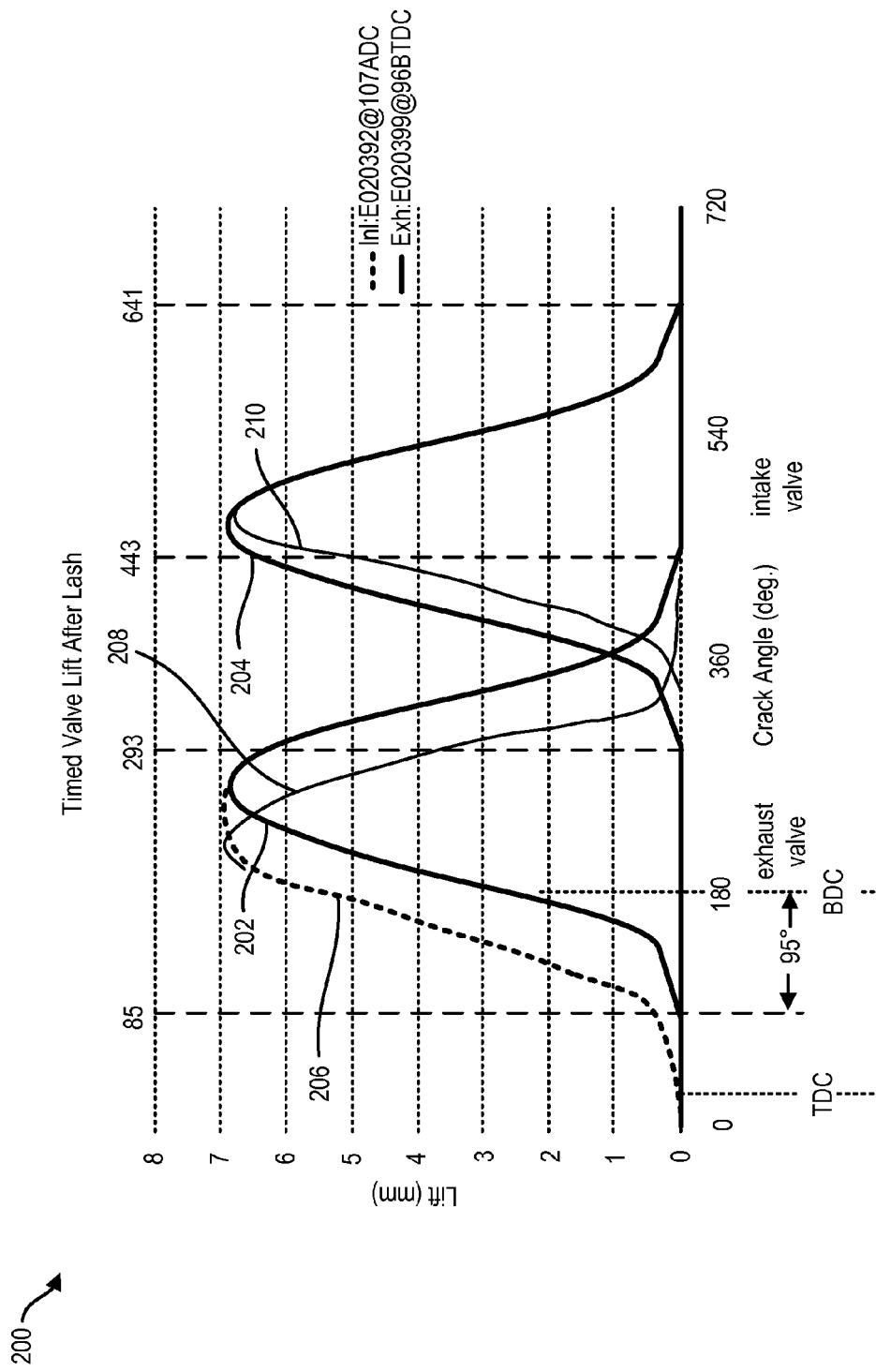
FIG. 2 shows a chart illustrating examples of valve timing.

FIG. 2 shows a chart 200 illustrating an example of normal valve timing and examples of adjusted valve timing consistent with implementations of the current subject matter. It will be understood that the depicted valve timings are merely exemplary and illustrative of brader concepts of the current subject matter and are not intended to be limiting. Lift is the distance of the valve sealing edge off a valve seat and lash is the mechanical slack in the valves changing direction.

The curves in FIG. 2 show valve lift plotted against crank angle over a four-stroke engine cycle (exhaust stroke, intake stroke, compression stroke, power or expansion stroke) with top dead center at the beginning of the power stroke (referred to as TDC firing) occurring at 0° and 720°, bottom dead center at the end of the power stroke and start of the exhaust stoke occurring at 180°, top dead center at the end of the exhaust stroke and start of the intake stroke (referred to as TDC overlap) occurring at 360°, and bottom dead center at the end of the intake stroke and start of the compression stroke occurring at 540°. The compression stroke ends and the power stroke of the next engine cycle begins at 720°. A four-stroke cycle lasts two crank rotations and hence the crank angle ranges from 0° to 720° in FIG. 2. The two curves on the left side of the chart are for the exhaust valve and the two on the right side curves are for the intake valve. The curve drawn in solid line shows movement of the exhaust and then intake valves under normal engine operating conditions. The exhaust valve begins to open at around 85° (95° before BDC on the power stroke) and reaches maximum lift in the region of 264° and then begins to close again, re-seating at around 443° in the cycle (about 80° to 85° after top dead center at the end of the exhaust stroke and beginning of the intake stroke). The right side of the curve drawn in solid line shows movement of the intake valve under normal engine operating conditions. The intake valve begins to open at around 293° 70° before TDC on the intake stroke (labeled as 293° in the cycle). It reaches maximum lift in the region of 107° after TDC (around 450° in the cycle) and then begins to close again, re-seating at around 80° after BDC (labeled 641° in the cycle). It will be noted that there is a range of crank angle during which both intake and exhaust valves are at least partially open, in this example between 293° and 443°.

For an early exhaust valve opening situation consistent with the above described first implementation, the start of exhaust valve opening can according to a first valve timing, in which the start of exhaust valve opening occurs closer to TDC firing than according to a second valve timing, that is used during normal operation of the internal combustion engine (e.g. when the catalyst is at or above the minimum target operating temperature). With further reference to FIG. 2, an example of such an early opening is shown as a dotted line 206. This indicates a start of exhaust valve opening at around 150° before BDC, which will lead to reduced work being extracted from the exhaust gases of the power stroke, as previously discussed. This curve 206 indicates a maximum exhaust valve lift at around the same crank angle as during normal engine operation, and an exhaust valve closing also consistent with normal operation. Thus in this example, the duration of opening of the exhaust valve is changed to a longer duration, and it can be seen that the shape of the dotted curve 206 is broadened as compared to the standard curve 202. In such an implementation, exhaust gases having an elevated temperature (e.g. excess sensible heat) can be delivered to a catalyst of the catalytic converter 122, thereby assisting in heating it up. Once the catalyst has reached a minimum target operating temperature, the first valve timing can be transitioned to a second valve timing, in which the exhaust valve opening is typical of "normal" engine operation.

In another example, consistent with implementations in which an exhaust valve opening duration is not changed while the first valve timing is used, the "normal" operation exhaust valve curve 202 can move to the left in FIG. 2 such that first valve timing includes an advanced exhaust valve profile with an earlier that normal opening and closing. Such an example is indicated by an exemplary curve 208 in FIG. 2, which follows the early opening longer duration curve 204 from the start of exhaust valve opening towards maximum lift, but instead of being broader, this curve 208 is similar in shape to the normal operation curve 202. The latter part of this curve 208 in which it no longer follows the longer duration curve is shown as a chained line. Thus the duration of exhaust valve opening is substantially similar to that during normal operation, resulting in the exhaust valve re-seating at around 380° in the illustrated example (e.g. shortly after TDC overlap, at the end of the exhaust stroke). This type of operation enables at least some of the exhaust gases to be retained and subsequently exchanged into the intake manifold 110 to cause pre-heating of the incoming fuel-air mixture that enters the cylinder during the intake stroke between 360° and 540° in FIG. 2. As discussed above, the pre-heating of the incoming charge can assist in providing combustion stability at lower engine temperatures. In other implementations, the exhaust valve opening duration may be shortened, thereby resulting in a narrowed curve (not shown) relative to the curve 208.

There may be a period near TDC overlap (e.g. at the end of the exhaust stroke) after which the exhaust valve has closed and before the inlet valve is open which will result in the piston compressing the residual charge and elevating its temperature. If inlet open timing is set to open before the piston has travelled back down the stroke a sufficient distance (re-expanding the compressed gasses), additional heat added to the residual gasses through piston work can be forced into the inlet port as the inlet valve opens and additional heat is thereby added to the inducted charge. Alternatively, with an early closing exhaust valve (208) that may be required with a fixed duration (timing shift) of an exhaust lift profile, a similarly early inlet cam timing could be implemented to reduce the pumping work associated with compression of the residual gasses at overlap. This would be beneficial to the pumping work associated with compressing gasses by the piston and may outweigh the advantages of adding extra heat to the incoming charge.

In some implementations of the current subject matter, the timing of the intake valve opening and/or closing can also be varied. For example, the intake valve can optionally open later under cold start conditions than under normal operation such that the residual gases in the cylinder combustion chamber are at or near an inlet manifold pressure. Under these conditions, the residual gases would more likely remain in the cylinder combustion chamber, and would therefore remain at an elevated temperature, be less likely to cause a backfire, etc. An exemplary curve 210 in FIG. 2 shows such a late intake valve opening. In this example, the intake valve opens at around 20° before TDC. The opening of the valve is shown as a double-chained line, which then merges with the curve 204 of normal engine operation as the valve reaches maximum lift and begins to close. One result of this change in intake valve opening timing is that the intake and exhaust valves are both open for a much shorter duration, thus reducing the likelihood of the incoming charge passing directly out of the exhaust valve. If this incoming charge contains some exhaust gas from a previous cycle, the reduced overlap can improve the retention of this elevated temperature gaseous mixture remaining in the combustion chamber. This intake opening timing adjustment may be useful in implementations of the current subject matter in which both of the exhaust valve opening and the exhaust valve closing are advanced under the first valve timing.

It will be appreciated that the degrees of crank rotation at which certain events happen as described above with respect to FIG. 2 are merely examples of normal operating conditions and possible adjustments thereto and could be varied from the particular crank angles shown consistent with the current subject matter. The opening and closing ramp of the camshaft and cam/valve lash can influence the official open/close time by +/−30 degrees. For example, the early exhaust valve opening (e.g. according to the first valve timing) can occur anywhere in the range of approximately 20° after TDC at the start of the power stroke (20° in FIG. 2) and 60° before BDC (120° in FIG. 2) on the power stroke and therefore be advanced relative to a second valve timing that is used once the catalyst has reached the minimum target operating temperature.

Consistent with some implementations of the current subject matter, a geometric compression ratio of an engine with variable compression ratio capabilities can be advantageously set at a very high value (e.g. a first compression ratio that is at least approximately concurrent with the first valve timing) for a cold or low engine load situation, which typically occurs just after engine start up. A second, reduced compression ratio can be used for normal engine operation, for example at least approximately concurrently with the second valve timing. Many current engines require fuel enrichment during startup to ensure stable combustion. The richer than normal fuel mixture can significantly increase emissions of hydrocarbons, carbon monoxide, and other pollutants in the exhaust gases. With a catalyst that has not yet reached its effective temperature, these pollutants are released to the atmosphere quantitatively, thereby contributing significantly to total vehicle emissions. In one example of a variable compression ratio engine, the first compression ratio can approximately 20:1 (or alternatively, in a range of approximately 12:1 to 25:1, a range of approximately 15:1 to 25:1, a range of approximately 12:1 to 20:1, a range of approximately 12:1 to 18:1 a range of approximately 13:1 to 23:1, a range of approximately 14:1 to 21:1, a range of approximately 18:1 to 22:1, other the like) at start-up to improve combustion stability and reduce or potentially eliminate the requirement for enrichment during cold engine starts. The compression ratio can be varied as a function of environment, engine temperature, and other aspects that affect combustion stability, efficiency, or emissions. Use of a larger first compression ratio at engine start-up relative to the second compression ratio used when the engine is operating at its operating temperature can also be combined with the approaches discussed above in which the first valve timing includes an advanced opening and an advanced closing of the exhaust valve, such that exhaust gases are retained in the cylinder and allowed to mix with the incoming fuel-air charge to provide pre-heating and further enhance combustion stability at lower engine temperatures. Use of variable compression ratio can provide one or more benefits, such as for example assisting in stabilization of combustion, allowing operation of an engine at a higher dilution ratio (e.g. addition of air in excess of a stoichiometric air-fuel ratio and/or recirculation of exhaust gases), and reducing engine-out engine emissions during warm-up (before catalyst light-off).

In some implementations of the current subject matter, the first compression ratio used at least approximately concurrently with the first valve timing can be reduced relative to the second compression ratio used at least approximately concurrently with the second valve timing. during normal engine operation with the catalyst at or above the minimum target operating temperature. In some example, the first compression ratio can be in a range of approximately 8:1 to 10:0 or alternatively approximately 9:1. The reduced first compression ratio can further reducing the reduced amount of work extracted from combustion of the fuel-air mixture and thereby result in additional sensible heat being conveyed to the catalyst via the exhaust gases.

Among other possible techniques, those described in several co-pending and co-owned patent publications, including U.S. Pat. No. 7,559,298, U.S. Pat. No. 8,413,619, U.S. Publication No. 2012-0089316, and U.S. Publication No. 2014/0000567A1, the disclosures of which are all incorporated herein by reference, may be used to effect a variable compression ratio.

The valve timing approaches described herein can be achieved through one or more cam phasing approaches. In some non-limiting examples, a variable valve timing approach such as those described in co-pending and co-owned patent publications, including U.S. Pat. No. 8,776,739 can be used. Such an exhaust cam phasing approach can also be applied to fixed-compression-ratio engines as well as to conventional single-piston engines running more typical compression ratios of, for example, 10:1. A high compression ratio can bring a combustion mixture closer to its auto-ignition temperature and thereby provide for easier spark ignition and flame propagation. Accordingly, high compression ratios can support stable combustion even with very high levels of residual exhaust gas in the combustion charge drawn into the cylinder(s) 106 from the intake manifold 110, such as in examples in which the first valve timing includes advanced opening and advanced closing of the exhaust valve. Such a mixture can be readily ignited, in particular under an elevated compression ratio.

Consistent with various implementations including those described above, before the burning mixture is fully expanded (or potentially even fully combusted), the exhaust valve is opened. Opening of the exhaust valve early causes less work to be extracted from the burning/burned combustion mixture and can cause the exhaust gas leaving the cylinder 106 through the exhaust port to be significantly hotter than it would have been had the exhaust valve opened with a more typical timing. The additional sensible heat/thermal energy in the exhaust gas can be transferred to the catalyst to speed up the heating of the catalyst to its target operating temperature. In some advantageous implementations of the current subject matter, the catalyst can be located in close proximity to the combustion chamber or in some manner that heat losses from the exhaust gas can be minimized in travel from the exhaust manifold 104 to the catalytic converter 122.

In an example of an operation mode for an engine consistent with implementations of the current subject matter, operation with early exhaust valve opening can be maintained for an initial period of time following engine start-up. For example, the initial period can be 10 to 15 seconds of operation in a normal 20° C. start up environment, or longer in a colder starting temperature environment. The initial period can be shorter or eliminated entirely if the engine and/or the catalyst is hot (e.g. above a certain temperature) at the time of start-up. Feedback from an oxygen sensor 116 or other exhaust sensors (e.g. an exhaust gas temperature sensor, a catalyst temperature sensor 120, etc.) positioned before and/or inside, and/or after the catalytic converter 122 can be could be used to offer feedback to the engine control module 112 regarding catalyst light-off and conversion efficiencies. Once the hot gases have assisted in heating up the catalyst 122 to achieve light-off and efficient operation, the valve timing can be brought back to normal. A compression ratio target (e.g. in an engine with variable compression ratio capabilities) for continued operation of the engine after the catalyst heat-up mode described above can then be defined by the necessary operating conditions of a "warm" engine.

In some implementations of the current subject matter, an early exhaust valve opening approach as discussed herein can be used in conjunction with chemical energy heating approach such as is discussed in the related application U.S. patent application Ser. No. 14/274,612, the disclosure of which is incorporated herein by reference. For example, at low temperature conditions, or if the catalyst temperature is below its minimum target operating temperature, hydrogen can be generated within a cylinder of the internal combustion engine and delivered to the catalyst in exhaust gases by an approach that includes combusting a first mixture having a first air-fuel ratio with an excess of fuel relative to a stoichiometric air-fuel ratio (a rich mixture) such that a reforming reaction occurs in the cylinder during the combusting of the first combustion mixture to generate the hydrogen in exhaust gases from the combustion of this first mixture. Oxygen can be provided in exhaust gases delivered to the catalyst by combusting a second mixture, either sequentially in the same cylinder or in another cylinder, that has a second air-fuel ratio with an excess of oxygen relative to a stoichiometric air-fuel ratio (a lean mixture) such that oxygen remains in exhaust gases generated from combustion of this second mixture. Heating of the catalyst can be enhanced, even at low temperatures insufficient for quantitative oxidation of hydrocarbons and carbon monoxide, by reacting at least some of the hydrogen and at least some of the oxygen delivered to the catalyst.

Additionally, in some examples in which variable compression ratio is achieved in an opposed piston engine by adjusting an offset of the timing with which the two opposed pistons reach their respective TDC positions (e.g. using crank phasing as in co-owned U.S. Pat. No. 8,413,619), the minimum combustion chamber volume, e.g. the effective TDC for the cylinder, is shifted. For example, if a leading crankshaft's piston arrives at its respective TDC at 0 deg, and the crankshafts are phased such that a second, lagging crankshaft's piston reaches its respective TDC at 20 deg after the first piston, the minimum volume between the pistons occurs at 10 deg after the first piston arrives and 10 before the second, so the combustion and cycle is shifted 10 deg relative to each crankshaft. Accordingly, a fixed exhaust valve timing can be advanced or retarded if it is driven by the leading or lagging crankshaft respectively. This enables the exhaust (or inlet) valve event to be phased relative to the effective TDC without the requirement of a camshaft phaser.

Figure 3:
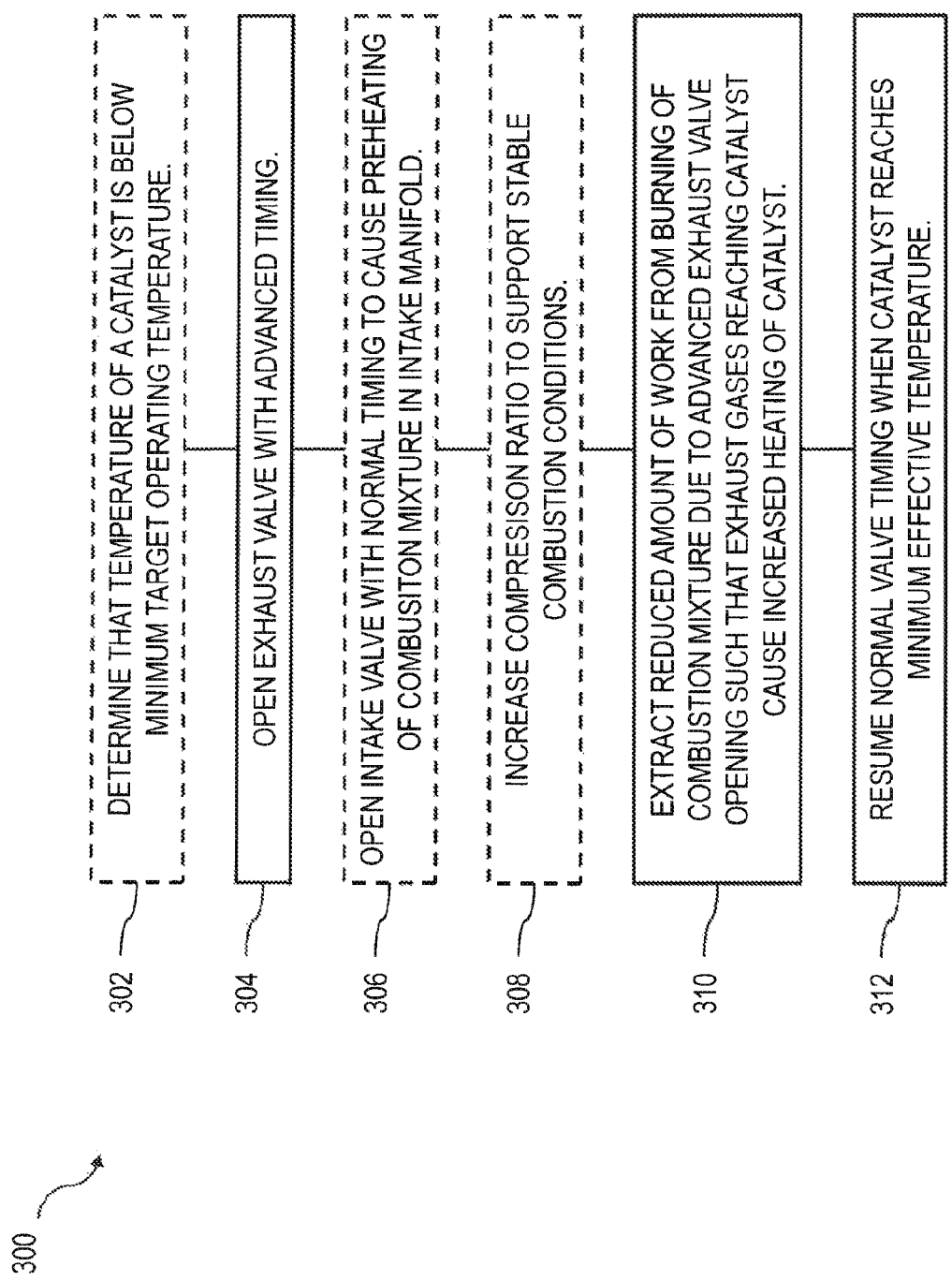
FIG. 3 shows a process flow diagram illustrating aspects of a method having one or more features consistent with implementations of the current subject matter.

FIG. 3 shows a process flow chart 300 illustrating features of a method consistent with an implementation of the current subject matter. One or more of these features can be included in other implementations. At 302, a temperature of a catalyst through which exhaust gases of an internal combustion engine are passed for removal of pollutants can optionally be determined to be below a minimum target operating temperature. The determining can include an actual measurement of the catalyst temperature and/or the composition of gases entering and/or exiting the catalyst. Alternatively, a presumption of an insufficient temperature can be based on an amount of time since engine start, based on external temperature readings, etc. In still other options, an assumption of an insufficient temperature can be a default condition that is overridden upon measurement of a temperature, a gas composition entering and/or exiting the catalyst, or other data that indicate that the default assumption is not accurate and that the catalyst is operating as intended. Moreover, compression ratio and/or exhaust valve timing can be adjusted while in operation in an open or closed loop control method to maintain a minimum catalyst operating temperature or conversion efficiency. Compression ratio during cold start and warm up can be adjusted to the stronger need of either low compression ratio to increase exhaust energy by reducing work extracted from the gasses in expansion or higher compression ratio to increase combustion stability, reduce enrichment, and provide more complete combustion and cleaner albeit lower temperature exhaust. Compression ratio can be managed independently or with exhaust and inlet valve timing strategies. At 304, an exhaust valve of the engine can be opened with an advanced timing relative to that for typical operation of the engine. The exhaust valve can open with advanced timing but close with a timing consistent with normal engine operation, consistent with the first implementation described above. Alternatively, the exhaust valve can optionally close with an advanced timing, for example prior to a piston reaching top dead center position in the cylinder, consistent with the second implementation described above. For example, an engine with a variable cam duration capability can be operated with an advanced exhaust valve opening event that is independent of the timing of the exhaust valve closing event. In other words, the exhaust valve closing event can occur earlier than in normal operation of the engine, at a same time as in normal operation of the engine, or with delayed timing relative to normal operation of the engine. In this manner, advancing the open event can be independent of advancing the close event.

At 306, opening of an intake valve optionally occurs with regular timing, which in some implementations may cause exhaust gases trapped in the cylinder by the advanced opening (and the optional advanced closing) of the exhaust valve to be admitted into an intake manifold where they preheat an incoming combustion mixture. Such preheating can be useful in assisting with stable combustion even at lower engine temperatures.

Alternatively or in addition, at 308 an elevated compression ratio can optionally be used in the cylinder, for example to allow stable combustion conditions at lower temperatures without requiring enrichment of the fuel mixture, thereby reducing emissions before the catalyst is combusted. As discussed above, the increased compression ratio can also assist with stabilizing combustion (for example if dilution of the combustion charge occurs by exhaust gases trapped by an early closing of the exhaust valve and subsequently admitted into the intake manifold 110, for leaner than stoichiometric operation through addition of excess air, for use of recirculated exhaust gases, etc.) and can thereby reduce engine-out engine emissions during warm-up (before catalyst light-off).

Alternatively, the intake valve opening can be delayed such that the intake valve opens close to or right at top dead center (e.g. after closing of the exhaust valve) to allow some compression work to increase the heat of the already hot gasses. In this manner, the intake valve opening can be timed to make use of mechanical work by the piston to pre-compress the exhaust and put more energy into the cylinder than otherwise would be available.

At 310, the early opening of the exhaust valve causes exhaust gases reaching a catalyst to have an elevated temperature due to less work being extracted than would be extracted during a normal engine cycle. The elevated temperature of the exhaust gases heats the catalyst to its effective temperature, either by exhaustion of the gases in that engine cycle (per the first implementation described above) or following a next power stroke (per the second implementation described above).

At 312, when the temperature of the catalyst is determined to have reached the minimum target operating temperature, operation of the engine can be resumed using "normal" valve timings.

It will be understood by those skilled in the art that one or more aspects or features of the ECM 112 can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, such as the catalyst temperature sensor 120 and the oxygen sensors 116, and at least one output device, such as the ignition control 114 an the fuel control 108. Such an ECM 112 can control operation of the exhaust valves and intake valves to thereby control opening and closing of the exhaust and intake ports, as described herein.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A system comprising:
   an exhaust valve controlling flow of gases for a cylinder of an internal combustion engine; and
   a controller system configured to perform operations of the internal combustion engine, the operations comprising:
      opening the exhaust valve according to a first valve timing that is advanced relative to a second valve timing, the opening resulting in a reduced amount of work being extracted from combustion of a fuel-air mixture in the cylinder due to exhaust gases produced by the combustion of the fuel-air charge retaining energy not converted to work in the form of excess sensible heat, the opening further resulting in the exhaust gases with the excess sensible heat being delivered to the catalyst to cause accelerated heating of the catalyst;
      changing to the second timing comprising a later opening of the exhaust valve when a catalyst reaches the minimum target operating temperature.

2. A method for heating a catalyst associated with an internal combustion engine, comprising:
   opening an exhaust valve of the internal combustion engine according a first valve timing such that the exhaust valve opening is advanced relative to a second valve timing;
   extracting a reduced amount of work from combustion of a fuel-air mixture in a cylinder having an exhaust port controlled by the exhaust valve, the reduced amount of work resulting from the advanced opening of the exhaust valve and causing exhaust gases produced by the combustion of the fuel-air charge to retain energy not converted to work in the form of excess sensible heat;
   delivering the exhaust gases with the excess sensible heat to a catalyst to cause accelerated heating of the catalyst; and
   changing to the second valve timing comprising later opening of the exhaust valve when the catalyst reaches the minimum target operating temperature.

3. The method of claim 2, wherein the internal combustion engine comprises an opposed-piston engine.

4. The method of claim 3, wherein the opposed-piston engine comprises two crankshafts attached to two respective opposed pistons, and the opposed piston engine further comprises a phasing mechanism for varying a piston timing with which the two respective opposed pistons reach respective top dead center positions, and wherein the changing to the second valve timing from the first valve timing comprises changing the driving of the exhaust valve from a leading crankshaft of the two crankshafts to a trailing crankshaft of the two crankshafts.

5. The method of claim 2, wherein the changing to the second valve timing from the first valve timing comprises operation of a phasing mechanism that alters a cam timing of at least one valve cam of the internal combustion engine relative to at least one crankshaft of the internal combustion engine.

6. The method of claim 2, wherein the first valve timing comprises initiating opening of the exhaust valve when a piston reciprocating in the cylinder is between approximately 20° after top dead center and approximately 60° before bottom dead center on a power stroke of a four-stroke engine cycle of the internal combustion engine.

7. The method of claim 6, wherein the first valve timing further comprises closing the exhaust valve after an end of an exhaust stroke that follows the power stroke.

8. The method of claim 6, wherein the first valve timing comprises closing the exhaust valve prior to an end of the exhaust stroke such that some of the exhaust gases are retained within the cylinder at a start of an intake stroke that follows the exhaust stroke.

9. The method of claim 8, wherein the first valve timing comprises a delayed opening of an intake valve such that piston work compresses and increases the sensible heat of the retained exhaust gases.

10. The method of claim 8, further comprising: drawing at least some of the retained exhaust gases into an intake manifold of the internal combustion engine.

11. The method of claim 10, wherein the intake valve opens earlier during the first valve timing than during the second valve timing.

12. The method of claim 11, wherein the earlier opening of the intake valve reduces pumping work required of the internal combustion engine.

13. The method of claim 10, further comprising:
mixing the retained exhaust gases drawn into the intake manifold with air and/or fuel to create a next fuel-air mixture for a next cycle of the internal combustion engine, the mixing causing a temperature of the next fuel-air mixture to be increased prior to delivery of the next fuel-air charge to the cylinder; and
delivering the next fuel-air mixture to the cylinder during a remainder of the intake stroke for combustion during a next power stroke.

14. The method of claim 13, further comprising operating the internal combustion engine at a first compression ratio at least approximately concurrently with the first valve timing, the first compression ratio being higher that a second compression ratio used at least approximately concurrently with the second valve timing, the first compression ratio assisting with stabilizing combustion during dilution of the fuel-air mixture resulting from the mixing of the retained exhaust gases drawn into the intake manifold.

15. The method of claim 14, wherein the first compression ratio is used instead of enriching the fuel-air mixture with excess fuel for combustion stability during low temperature engine operation.

16. The method of claim 2, further comprising operating the internal combustion engine at a first compression ratio at least approximately concurrently with the first valve timing, the first compression ratio being higher that a second compression ratio used at least approximately concurrently with the second valve timing.

17. The method of claim 2, further comprising operating the internal combustion engine at a first compression ratio at least approximately concurrently with the first valve timing, the first compression ratio being lower than a second compression ratio used at least approximately concurrently with the second valve timing, the first compression ratio further reducing the reduced amount of work extracted from combustion of the fuel-air mixture.

18. The method of claim 2, further comprising:
determining that a temperature of the catalyst is below a minimum target operating temperature of the catalyst; and
using the first valve timing based on the determining.

19. The method of claim 2, further comprising also adding heat to the catalyst during the first valve timing by a chemical process.

20. The method of claim 19, wherein the chemical process comprises generating hydrogen and oxygen by manipulating combustion conditions in the cylinder and/or the cylinder and at least one other cylinder of the internal combustion engine to result in a reforming reaction, and delivering the generated hydrogen and oxygen for reaction at the catalyst.

21. A computer program product comprising a machine-readable medium encoding instructions that, when executed by at least one programmable processor, cause the at least one programmable processor to perform, or cause to be performed, operations of an internal combustion engine, the operations comprising:
opening an exhaust valve of the internal combustion engine according a first valve timing such that the exhaust valve opening is advanced relative to a second valve timing;
extracting a reduced amount of work from combustion of a fuel-air mixture in a cylinder having an exhaust port controlled by the exhaust valve, the reduced amount of work resulting from the advanced opening of the exhaust valve and causing exhaust gases produced by the combustion of the fuel-air charge to retain energy not converted to work in the form of excess sensible heat;
delivering the exhaust gases with the excess sensible heat to a catalyst to cause accelerated heating of the catalyst; and
changing to the second valve timing comprising later opening of the exhaust valve when the catalyst reaches the minimum target operating temperature.

* * * * *